United States Patent
Zappe

(10) Patent No.: US 6,210,590 B1
(45) Date of Patent: Apr. 3, 2001

(54) METHOD FOR CONTROLLING THE QUALITY OF COOKING FATS AND COOKING OILS

(76) Inventor: Ronald J. Zappe, P.O. Box 1533, Gramercy, LA (US) 70052-1533

(*) Notice: Subject to any disclaimer, the term of this patent is extended or adjusted under 35 U.S.C. 154(b) by 0 days.

(21) Appl. No.: 09/179,064

(22) Filed: Oct. 26, 1998

Related U.S. Application Data

(62) Division of application No. 09/010,272, filed on Jan. 21, 1998, now Pat. No. 5,846,409.

(51) Int. Cl.[7] ................................................ A23L 1/015
(52) U.S. Cl. ............................ 210/739; 210/805; 426/417
(58) Field of Search ................................... 210/739, 805, 210/807; 426/417

(56) References Cited

U.S. PATENT DOCUMENTS

| | | |
|---|---|---|
| 2,698,092 | 12/1954 | Morton .............................. 210/122.2 |
| 3,447,685 | 6/1969 | Bircher ................................. 210/167 |
| 3,630,361 | 12/1971 | Keating ................................... 210/85 |
| 3,667,613 | 6/1972 | Angold .................................. 210/336 |
| 4,243,523 * | 1/1981 | Pelmulder ............................. 210/652 |
| 4,747,944 | 5/1988 | George ................................. 210/167 |
| 4,880,652 * | 11/1989 | Regutti ................................. 426/417 |
| 5,049,264 * | 9/1991 | Rosnack et al. ................ 210/DIG. 8 |
| 5,247,876 | 9/1993 | Wilson et al. .......................... 99/408 |
| 5,320,755 * | 6/1994 | Hagqvist et al. ..................... 210/805 |
| 5,597,601 | 1/1997 | Griffin ................................. 426/417 |
| 5,620,897 | 4/1997 | Zappe ..................................... 436/23 |

* cited by examiner

*Primary Examiner*—Matthew O. Savage
(74) *Attorney, Agent, or Firm*—Reginald F. Roberts, Jr.

(57) ABSTRACT

An adjustable continuous filtration system for cooking fats and cooking oils. Using a variable orifice restriction such as a valve, the amount of cooking fat or cooking oil recycled to a filter is controlled in accordance with the results of testing the discharged cooking fat or cooking oil for quality control, by changing the size of the orifice. If the discharged fat or oil is not within industry standards, the proportion being recycled is increased. If the fat or oil tests appreciably above industry standards, the proportion recycled to the filter is decreased.

4 Claims, 3 Drawing Sheets

METHOD FOR CONTROLLING THE QUALITY OF COOKING FATS AND COOKING OILS

This is a division of application Ser. No. 010,272, filed Jan. 21, 1998 now U.S. Pat. No. 5,846,409.

BACKGROUND OF THE INVENTION

The present invention relates to filtration. More particularly, the invention relates to a filtration system for quality control of cooking fats and cooking oils.

In the culinary industry filtration is generally employed to purify used cooking fats and cooking oils. In the absence of such purification, impurities build up in the fats and oils to a level which is unacceptable by industry standards.

As fats and oils are used in cooking, they tend to break down, degrade, and hydrolyze to free fatty acids, glycerol, and other polar products. The free fatty acids are among the more harmful products of this degradation. The recommended maximum acceptable level for free fatty acids is three to four percent.

The prior art discloses filtration systems for removing such impurities from cooking fats and cooking oils; see, e.g., U.S. Pat. Nos. 5,597,601, 4,747,944, 3,667,613, 5,247,876, 3,107,601, 2,698,092, and 3,630,361. What is lacking, however, is a filtration system which is adjustable in accordance with the quality of the cooking fat or cooking oil which is being filtered. The present invention provides such a system.

More specifically, the prior art fails to provide filtration apparatus in which a predetermined portion of the cooking fat or cooking oil is recycled to the filtration system before being discharged therefrom. For example, U.S. Pat. No. 4,747,944 to George discloses a filtration system in which filtrate is recirculated by being discharged into a vessel which contains unfiltered cooking fat or cooking oil. The mixture of partially-filtered fat or oil is then returned to the filter. An obvious drawback of this system is the absence of any mechanism for controlling the proportion of the fat or oil which is recycled to the filter. A second apparent limitation is the requirement of a vessel for mixing the liquid discharged from the filter with unfiltered liquid.

SUMMARY OF THE INVENTION

In general, the present invention in a first aspect provides an adjustable continuous filtration system. The filtration system comprises a filter; means for pressurizing a fluid for conveyance to the filter; means for recycling a portion of the fluid to the filter; and means for controlling the proportion of the fluid which is recycled to the filter before being discharged from the system.

A first embodiment of the filtration system comprises a filter; means for pressurizing a fluid to be conveyed to the filter; a first passageway for receiving the pressurized fluid from the pressurization means; a second passageway for receiving fluid discharged from the filter; means for lowering the pressure in the second passageway below the pressure in the first passageway; a third passageway connected to the pressure-lowering means; a fourth passageway connected to the third passageway and to the filter; a fifth passageway connected to the third and fourth passageways; a sixth passageway for discharging fluid from the fifth passageway; and an orifice restriction disposed between the fifth and sixth passageways, for controlling the rate of flow of the fluid through the fourth, fifth, and sixth passageways. The first, second, third, fourth, fifth, and sixth passageways, the pressure-lowering means, and the orifice restriction are constructed and arranged so that fluid discharged from the third passageway is split into a first stream flowing through the fourth passageway and a second stream flowing through the fifth passageway, and the proportion of fluid which is recycled to the filter before being discharged through the sixth passageway is controlled and determined by the size of the orifice in the orifice restriction between the fifth and sixth passageways.

A second embodiment of the filtration system comprises a filter; means for pressurizing a fluid to be conveyed to the filter; a first passageway for receiving the pressurized fluid from the pressurization means; a second passageway for receiving fluid discharged from the filter; means for lowering the pressure in the second passageway below the pressure in the first passageway ; a third passageway connecting the first passageway and the filter to one another; a fourth passageway connected to the first and third passageways; a fifth passageway for discharging fluid from the fourth passageway; and an orifice restriction disposed in the third passageway, for controlling the rate of flow of the fluid through the third, fourth, and fifth passageways. The pressure-lowering means are disposed between the fourth and fifth passageways. The second passageway connects the pressure-lowering means and the filter to one another. The first, second, third, fourth, and fifth passageways, the pressure-lowering means, and the orifice restriction are constructed and arranged so that fluid discharged from the first passageway is split into a first stream flowing through the third passageway and a second stream flowing through the fourth passageway, and the proportion of the fluid which is routed to the filter before being discharged through the fifth passageway is controlled and determined by the size of the orifice in the orifice restriction in the third passageway.

A third embodiment of the filtration system comprises a filter; means for pressurizing a fluid to be conveyed to the filter; a first passageway for receiving the pressurized fluid from the pressurization means; a second passageway for receiving fluid discharged from the filter; a third passageway connecting the first passageway and the filter to one another; a fourth passageway connected to the first and third passageways; a fifth passageway for discharging fluid from the fourth passageway; a first orifice restriction disposed in the third passageway, for controlling the rate of flow of the fluid through the third, fourth, and fifth passageways; and a second orifice restriction disposed in the fourth passageway, for controlling the rate of flow of the fluid through the fourth, second, and fifth passageways. The first, second, third, fourth, and fifth passageways, and the first and second orifice restrictions are constructed and arranged so that the fluid discharged from the first passageway is split into a first stream flowing through the third passageway and a second stream flowing through the fourth passageway, and the proportion of the fluid which is recycled to the filter before being discharged through the fifth passageway is controlled and determined by the sizes of orifices in the first and second orifice restrictions in the third and fourth passageways, respectively.

A fourth embodiment of the filtration system comprises a filter; means for pressurizing a fluid to be conveyed to the filter; a first passageway for receiving the pressurized fluid from the pressurization means; a second passageway for receiving fluid discharged from the filter; means for lowering the pressure in the second passageway below the pressure in the first passageway; a third passageway connected to the pressure-lowering means; a fourth passageway connected to the third passageway and to the filter; and a fifth passageway connected to the third and fourth passageways, for discharging fluid from the filtration system. The first, second, third, fourth, and fifth passageways, and the pressure-lowering means are constructed and arranged so that fluid discharged from the third passageway is split into a first stream flowing through the fourth passageway and a second stream flowing through the fifth passageway, and the proportion of the fluid which is recycled to the filter before being discharged from the fifth passageway is controlled and determined by the widths of the orifices in the fourth and fifth passageways.

The direction of fluid flow through the filter can be reversed.

In a second aspect the invention provides a method for controlling the quality of cooking fats and cooking oils. The method comprises providing a filter for filtering the cooking fats or cooking oils; pressurizing a cooking fat or a cooking oil for conveyance to the filter; recycling a portion of the cooking fat or the cooking oil to the filter; and controlling the proportion of the cooking fat or the standards, the proportion of the cooking fat or cooking oil which is recycled is increased. If the quality of the discharged cooking fat or cooking oil is appreciably above industry standards,the proportion of the cooking fat or cooking oil which is recycled is decreased.

In a third aspect the invention provides a method for controlling the proportion of fluid recycled through a filtration system. The method comprises providing a filter for filtering the fluid; pressurizing the fluid for conveyance to the filter; conveying the pressurized fluid to the filter; recycling a portion of the fluid to the filter; and using an orifice restriction to control the proportion of the fluid which is recycled to the filter before being discharged from the system.

DETAILED DESCRIPTION OF THE INVENTION

Figure 1:
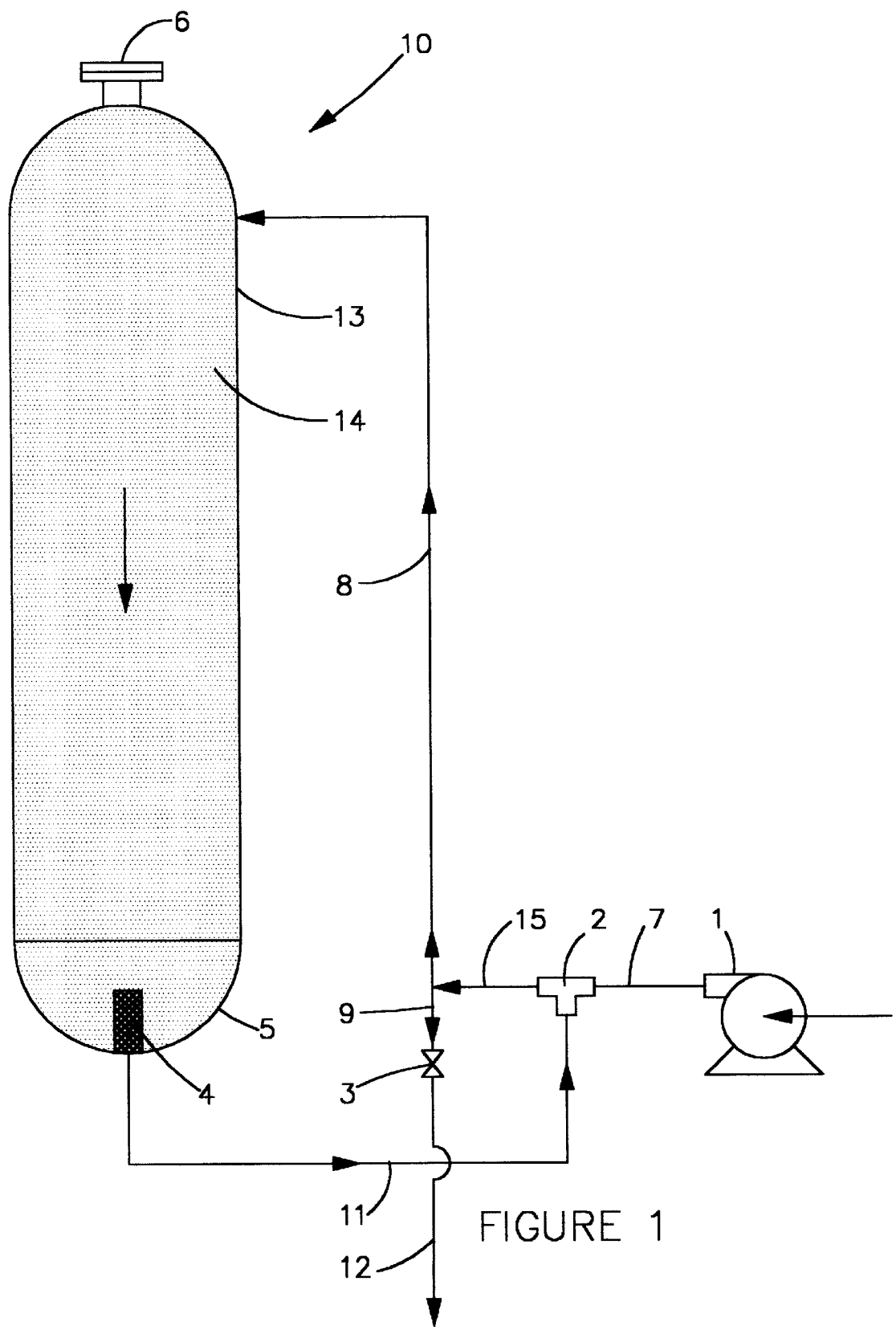
FIG. 1 is a schematic representation of a first embodiment of an adjustable continuous filtration system made in accordance with the principles of the present invention.

More specifically, reference is made to FIG. 1, in which is shown a first embodiment of an adjustable continuous filtration system, made in accordance with the principles of the present invention, and generally designated by the numeral 10.

A pump 1 discharges a fluid into line 7. An ejector 2 creates a partial vacuum in line 11, and/or lowers the pressure in line 11 below that in line 7. Fluid discharged from the ejector 2 is split into first and second streams which flow through lines 8 and 9, respectively. Fluid in line 8 enters a container 13 filled with a filter medium 14, percolates or diffuses therethrough, and after passing through a particle-retaining screen 4 exits through line 11 and is recycled to the ejector 2. An orifice restriction 3 between lines 9 and 12 controls the rate of fluid flow through lines 8, 9, and 12 by imposing a pressure drop across the orifice restriction 3. By varying the size of the orifice, the rates of flow through lines 8, 9, and 12 can be varied as much as desired. Thus, when the pressure drops across the container 13 and the orifice restriction 3 are equal, the rate of flow through line 8 is the same as through lines 9 and 12. By increasing the restriction, i.e. by decreasing the size of the orifice between lines 9 and 12, a slower rate of flow is obtained through lines 9 and 12 than through line 8. The opposite effect is achieved by decreasing the restriction, i.e. by increasing the size of the orifice between lines 9 and 12, so that more of the partially-filtered fluid is discharged through line 12 than is recycled to the container 13 through line 8. Preferably, the orifice restriction 3 is constructed and arranged to enable continuous variation of the degree of restriction without interrupting the flow to change or adjust the orifice-restriction device. One means of so doing is to use a valve, preferably a needle valve, as the orifice restriction 3.

Figures 2, 3:
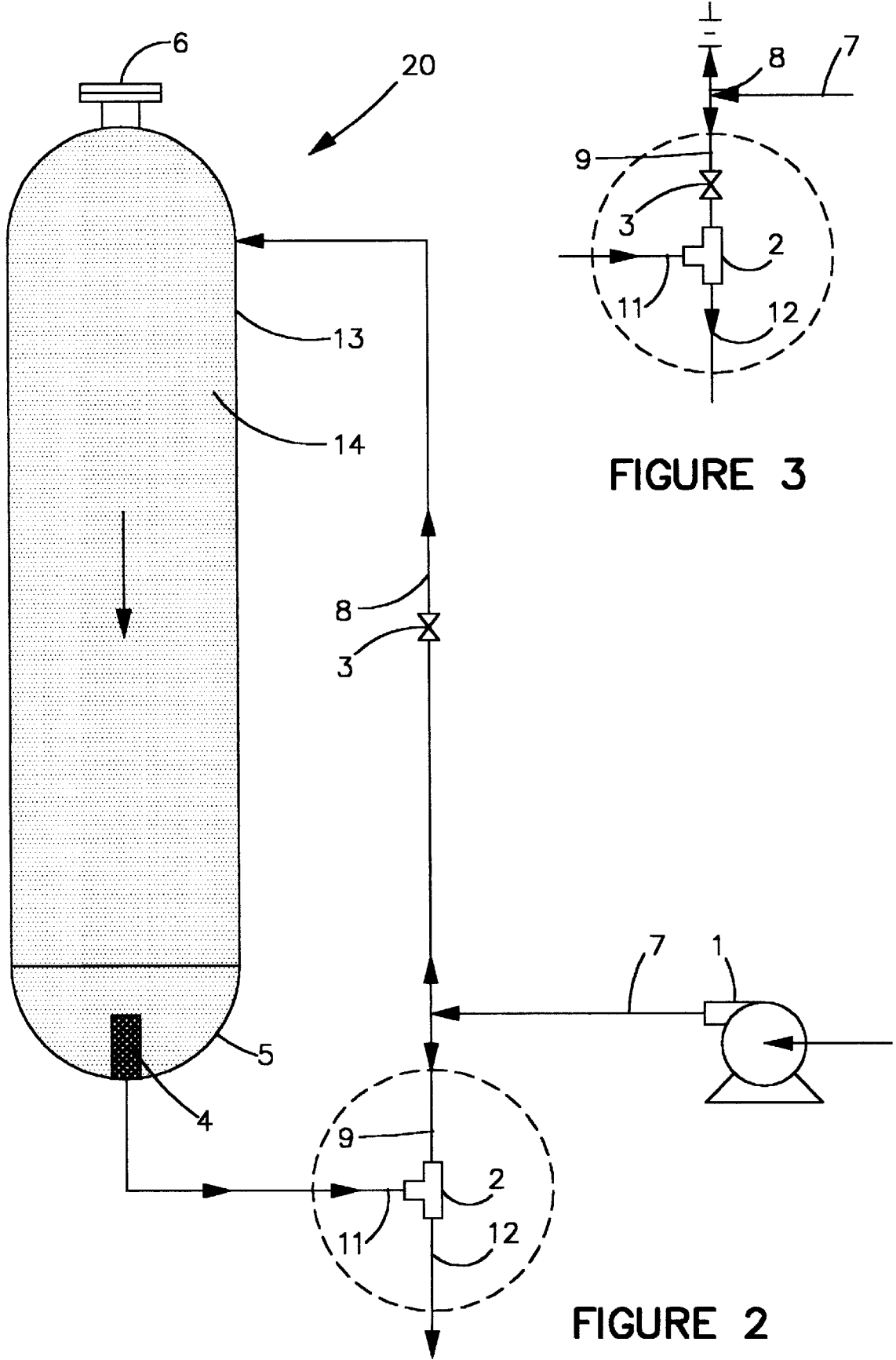
FIG. 2 is a schematic representation of a second embodiment of an adjustable continuous filtration system made in accordance with the principles of the present invention.
FIG. 3 is a schematic representation of a portion of a third embodiment of an adjustable continuous filtration system made in accordance with the principles of the present invention.

Reference is now made to FIG. 2, in which is shown a second embodiment of an adjustable continuous filtration system, made in accordance with the principles of the present invention, and generally designated by the numeral 20.

In this embodiment of the filtration system 20, the orifice restriction 3 is disposed in line 8. The function of the orifice restriction 3 remains the same; viz., to control the rates of fluid flow through lines 8 and 9, thereby controlling the proportion of fluid routed to the filter 13.

Reference is now made to FIG. 3, in which is shown a portion of a third embodiment of an adjustable continuous filtration system made in accordance with the principles of the present invention. In this third embodiment, orifice restrictions 3 are provided in lines 8 and 9, and the ejector 2 interconnects lines 9, 11, and 12.

Figure 4:
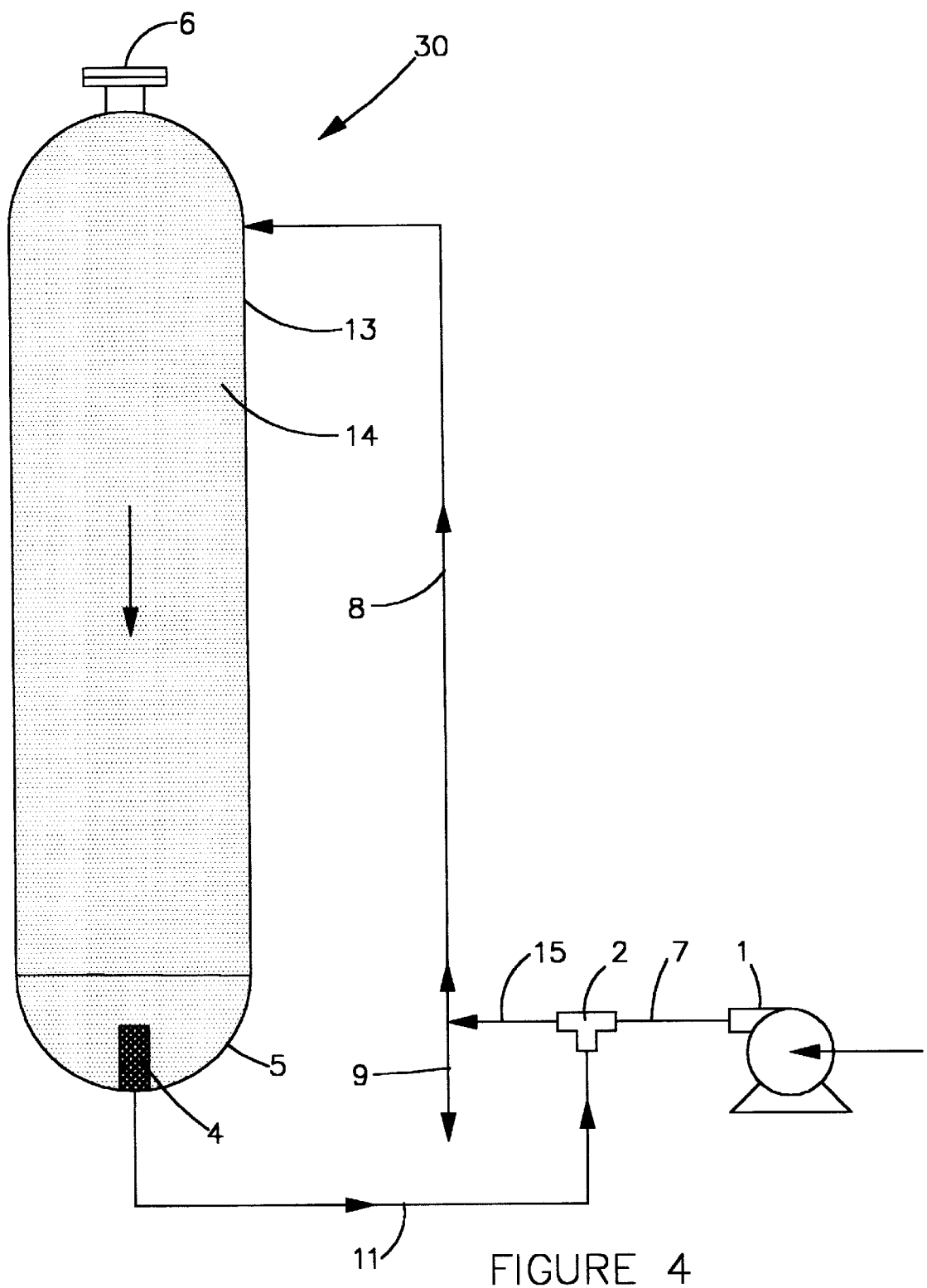
FIG. 4 is a schematic representation of a fourth embodiment of an adjustable continuous filtration system made in accordance with the principles of the present invention.

Reference is now made to FIG. 4, in which is shown a fourth embodiment of an adjustable continuous filtration system, made in accordance with the principles of the present invention, and generally designated by the numeral 30. The fourth embodiment 30 of the filtration system is similar to the first embodiment 10 of the filtration system shown in FIG. 1, except that in the fourth embodiment 30 the orifice restriction 3 and line 12 are omitted from the system. In the fourth embodiment 30, the proportion of fluid recycled to the filter 13 is controlled and determined by the widths of the orifices in lines 8 and 9.

In a preferred embodiment of the present invention the filtration system is used to filter and/or purify used cooking fats and cooking oils. For this purpose the partially filtered or partially treated cooking fat or cooking oil is tested for quality control, to see whether it satisfies the specifications of the industry. If the discharged fat or oil is not within the specifications, the proportion of fat or oil being recycled through line 8 is increased by decreasing the size of the orifice between lines 9 and 12 (FIG. 1) or by increasing the size of the orifice in line 8 (FIG. 2). If the fat or oil tests far better than is required by the specifications, the recycle rate through line 8 is decreased by increasing the size of the orifice between lines 9 and 12 (FIG. 1) or by decreasing the size of the orifice in line 8 (FIG. 2). If purification other than filtration is needed, an adsorbent is substituted for the filter medium 14. Since fats are by definition solid at room temperature, heat and/or thermal insulation is supplied or provided to maintain the fats in a liquid state while circulating in and through the filtration system.

It is to be understood that, if desired, a filter press or filter leaf could be used instead of a container filled with a filter medium. Such substitution would in no way affect the basic concept of the present invention. Moreover, instead of an ejector, any other means of lowering the pressure in line 11 would suffice, and would lie within the scope of the present invention. The use of an ejector is, however, clearly advantageous and is to be preferred, because it provides a compact means for so doing which is simpler, requires less space, and comprises no moving parts as compared, e.g., to a vacuum pump or a vacuum line.

Many restaurants continue to use their cooking fats and cooking oils well beyond the recommended maximum 3–4% fatty-acid content. This is primarily because, until recently, there has been no accurate, simple, and rapid method for determining the percentage of free fatty acids therein. There is now, however, an analytical method which is simple, quick, and accurate. This method is preferred for determining the free fatty-acid content of cooking fats and cooking oils in combination with the filtration/purification system and method herein described. The method is described in detail in U.S. Pat. No. 5,620,897 to Zappe, which is hereby incorporated by reference.

The term "fluid" includes liquids, vapors, and gases. While the preferred embodiment of the present invention utilizes liquid cooking fats and cooking oils as the filtrand, the apparatus and method are by no means limited or restricted in scope to the filtration of liquids, and include the filtration of vapors and gases to remove, e.g., particulate solids therefrom.

I claim:

1. A method for controlling the quality of cooking fats and cooking oils, the method comprising the steps of:

(a) providing a filter for filtering the cooking fats or cooking oils;

(b) conveying a cooking fat or a cooking oil to the filter;

(c) recycling a first portion of the cooking fat or the cooking oil to the filter;

(d) controlling a flow rate of the first portion of the cooking fat or cooking oil which is recycled to the filter, and discharging a second portion of the cooking fat or cooking oil from the filter;

(e) analyzing the second portion of the cooking fat or cooking oil for quality control;

(f) increasing the flow rate of the recycled first portion of the cooking fat or cooking oil if the quality of the discharged second portion of the cooking fat or cooking oil is unacceptable; and (g) decreasing the flow rate of the recycled first portion of the cooking fat or cooking oil if the quality of the discharged second portion of the cooking fat or cooking oil is higher than required to be acceptable.

2. The method of claim 1, wherein an orifice restriction is used to control the proportion of the cooking fat or the cooking oil which is recycled to the filter before being discharged.

3. The method of claim 1, wherein a variable orifice restriction is used to control the proportion of the cooking fat or the cooking oil which is recycled to the filter before being discharged.

4. The method of claim 1, wherein a valve is used to control the proportion of the cooking fat or the cooking oil which is recycled to the filter before being discharged.

\* \* \* \* \*